US000001964H

(19) United States

(12) Statutory Invention Registration (10) Reg. No.: US H1964 H

Hoffpauir et al. (43) Published: Jun. 5, 2001

(54) RESOURCE MANAGEMENT SUB-SYSTEM OF A TELECOMMUNICATIONS SWITCHING SYSTEM

(75) Inventors: Scott D. Hoffpauir; Howard L. Anderson, both of Collierville; William Doughty; James B. Palmer, both of Memphis, all of TN (US)

(73) Assignee: DSC/Celcore, Inc., Plano, TX (US)

(21) Appl. No.: 09/026,190

(22) Filed: Feb. 19, 1998

Related U.S. Application Data

(60) Provisional application No. 06/060,107, filed on Sep. 26, 1997, and provisional application No. 60/071,151, filed on Jan. 12, 1998.

(51) Int. Cl.[7] ..... H04L 12/28

(52) U.S. Cl. ..... 370/419

(56) References Cited

FOREIGN PATENT DOCUMENTS

0123456-A2 1/2000 (EP) ..... 100/100

*Primary Examiner*—Daniel T. Pihulic

(74) *Attorney, Agent, or Firm*—John G. Flaim

(57) ABSTRACT

A telecommunications switching system with a hardware resource manager system. The resource manager interfaces with higher-level system functions such as call processing, OA&M, NMS and system control functions and with lower-level hardware functions embodied in an input/output sub-system (IOSS) containing various hardware resources for interfacing the switching system to other entities. The resource manager controls all interactions between the IOSS hardware and the higher-level functions and hides the hardware specifics of the IOSS, giving the higher-level functions a hardware-independent view of the IOSS resources. As a result, the higher-level functions can operate without modification with a wide variety of IOSS hardware configurations. The resource manager manages the physical interfaces and IOSS resources and is aware of the complete configuration of the IOSS, including all channel addressing information and the state of each IOSS resource. The interfaces between the resource management sub-system and the higher-level functions utilize distributed objects. The resource manager uses the configuration and state information from the IOSS to model each hardware component and communications channel as a managed object, which managed objects are used in the object-oriented interfaces with the higher-level functions of the switching system. Resource characteristics and statuses are available to the higher-level functions as attributes of the resource models. Method calls are provided to manipulate the objects for such operations as loading, testing and controlling the states of the various modeled hardware resources.

3 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RESOURCE MANAGEMENT SUB-SYSTEM OF A TELECOMMUNICATIONS SWITCHING SYSTEM

CLAIM OF PRIORITY

The instant patent application claims priority from U.S. Provisional Patent Application Serial No. 60/060,107, entitled CELLULAR COMMUNICATION SYSTEM, filed on Sep. 26, 1997 and U.S. Provisional Patent Application Serial No. 60/071,151, entitled COMMUNICATION SYSTEM SWITCHING SYSTEM RESOURCE MANAGER, filed Jan. 12, 1998.

FIELD OF THE INVENTION

The present invention relates to telecommunications systems, and more particularly to the management and control of resources in a telecommunications switching system.

BACKGROUND INFORMATION

A conventional telecommunications switching system comprises a variety of hardware and software components. Typical hardware components include a switching device, for routing calls into and out of the system; trunk interface devices, for interfacing the system to incoming and outgoing trunks (e.g., E1 or T1); signal generating devices for generating various call progress signals, DTMF tones, etc.; digital signal processors (DSPs) for compressing and decompressing digitally encoded voice signals and/or performing echo cancellation, and a controller for controlling the operation of the overall switching system and for providing call processing (CP) and operations, administration and maintenance (OA&M) functions. The system may also include a network management system (NMS) for such functions as configuration, accounting, fault management and testing.

A conventional wireless telecommunications switching system includes a base station controller (BSC) coupled to multiple base transceiver stations (BTS) over one or more spans, a mobile switching center (MSC), a visitor location register (VLR), a home location register (HLR), an authentication center, an operations, administration and maintenance (OA&M) center for configuring the BSC and an OA&M operation maintenance center-switching component for configuring the HLR and/or the MSC.

The various software components of such switching systems typically reside in the controller and in one or more of the other lower-level hardware components. For example, the switching device may have its own processor, executing low-level code resident in non-volatile memory in the switching device. The controller would typically interact with the other hardware components by sending specific commands or exchanging specific messages over a bus in a well-defined manner.

The software configuration of such conventional switching systems can be characterized as being tightly coupled vertically. In other words, the various layers or components of software are highly interdependent and also highly hardware- or platform-dependent. Modification of one component of software to add functionality would likely require modification of other components. Likewise, modification of the hardware, would likely require extensive modification of software. Furthermore, such software once written for a particular platform, cannot be readily redistributed over multiple, possibly remotely located processors. This makes for an inflexible switching system that cannot be readily modified.

SUMMARY OF THE INVENTION

The present invention is directed to a telecommunications switching system comprising a novel hardware control and interface arrangement.

In accordance with an exemplary embodiment of the present invention, a telecommunications switching system comprises a hardware resource management and interfacing sub-system (or "resource manager"). The resource manager interfaces with higher-level system functions such as call processing, OA&M, NMS and system control functions and with lower-level hardware functions embodied in an input/output sub-system (IOSS) containing various hardware resources for interfacing the switching system to other switching systems, including both wireline and wireless switching systems in the Public Switched Telephone Network (PSTN) and/or the Public Land Mobile Network (PLMN).

The resource manager controls all interactions between the IOSS hardware and the higher-level functions and hides the hardware specifics of the IOSS, giving the higher-level functions a hardware-independent view of the IOSS resources. This capability makes it possible, for example, to completely change out the IOSS hardware platform without necessitating any alteration of the higher-level software thereby providing portability and flexibility to the higher-level functions. The resource manager manages the physical interfaces and IOSS resources, including the switching matrix, tone generators, voice announcements, digit collectors, LAPD links, transcoders, echo cancelers and trunks. The resource manager is aware of the complete configuration of the IOSS, including all channel addressing information and the state of each IOSS resource.

In an exemplary embodiment of the present invention, the interface between the resource manager and the IOSS is a message-based interface carried over an internal system Ethernet, or LAN, through Transmission Control Protocol/Internet Protocol (TCP/IP) sockets. The interfaces between the resource manager and the higher-level functions utilize distributed objects and are based on an Object Request Broker (ORB) scheme. The resource manager uses the configuration and state information from the IOSS to model each hardware component and communications channel as a managed object, which managed objects are used in the object-oriented interfaces with the higher-level functions of the switching system. Resource characteristics and statuses are available to the higher-level functions as attributes of the resource models. In an exemplary interface between OA&M functions and the resource manager, method calls are provided to manipulate the objects for such operations as loading, testing and controlling the states of the various modeled hardware resources. These calls are routed to the appropriate modeled object and the appropriate messaging is exchanged with the IOSS. In another exemplary interface, the call processing function and the resource manager interface via two objects whose method calls initiate such actions as making or breaking switch matrix connections and allocating traffic channels.

The resource management sub-system of the present invention can also be implemented to manage a particular resource or type of resource, as opposed to an entire array of hardware resources. In a further exemplary embodiment, a specialized resource management sub-system is dedicated to a trunk signaling sub-system. In this case, the specialized resource manager interfaces with the main resource manager with a distributed object interface.

DETAILED DESCRIPTION

Figure 1:
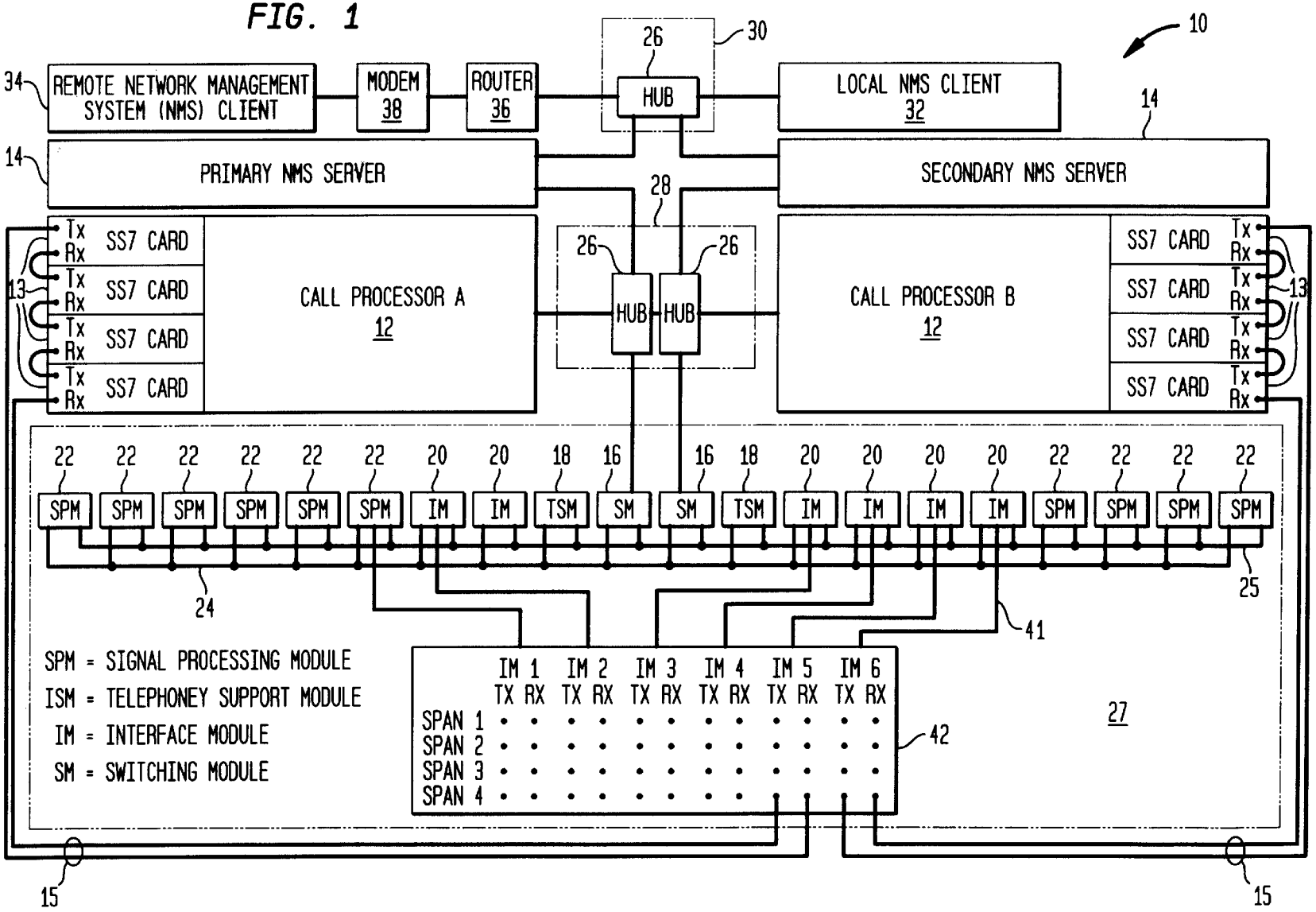
FIG. 1 is a block diagram of an exemplary telecommunications switching system.

FIG. 1 is a block diagram of an embodiment of an exemplary wireless switching system 10 to be used in accordance with the present invention. The exemplary switching system 10 includes redundant call processors 12, redundant Network Management System ("NMS") servers 14, redundant switching modules (SM) 16 as well as various other resource modules 18, 20, 22 that carry out a number of the lower-level tasks to be accomplished by the switching system 10. (Where redundant resources are provided, only one such resource is active. Any references herein to one of several redundant resources should be understood to be to the active redundant resource.) Resource modules include, for example, a telephony-support module (TSM) 18, an interface module (IM) 20, and a signal-processing module (SPM) 22. The exemplary system of FIG. 1 includes multiple IM 20, SPM 22 and redundant TSM 18.

The switching modules 16 and other resource modules 18, 20, 22 communicate with each other through, for example, a control bus 24. Data is passed between the modules over high-speed data buses 25, which are preferably time-multiplexed serial data buses. The switching modules 16 preferably communicate with higher-level functional elements (the call processors 12, for example) within the switching system 10 through communication hubs 26. In an embodiment of the present invention, logical communication paths are made between the resource modules 18, 20, 22 and the higher-level functional elements via the switching module 16 through, for example, TCP/IP sockets through the communication hubs 26.

The communication hubs 26 also connect the call processors 12 and the switching modules 16 to the NMS servers 14. Preferably, there are two distinct LANs 28 and 30 within the switching system 10. The first LAN 28 connects the redundant call processors 12 to the redundant NMS servers 14 and the redundant switching modules 16 through the redundant communication hubs 26. The second LAN 30 can connect the redundant NMS servers 14 to local NMS clients 32 and/or remote NMS clients 34. Connection to remote NMS clients 34 is preferably performed through a router 36 and a modem 38. Since there is no direct NMS client access to the first LAN 28 on which the call processors 12, the switching modules 16, or the resource processors 18, 20, 22 operate, the NMS servers 14 may serve as "firewalls" against unauthorized intrusion into the switching system 10.

With further reference to FIG. 1, the interface modules 20 connect externally to telecommunication spans 40 (not shown), which are, for example, industry-standard T1 or E1 spans, each carrying a number of information channels as specified by the particular standard. These information channels may be traffic channels or control channels, as will be discussed below. Connection to the spans are made through span signal paths 41 from the interface modules to a span connector panel 42, which is the point at which the telecommunication spans 40 physically connect to the switching platform 10. The connector panel 42 provides connectivity to and from span interfaces on the interface modules 20, with each interface module 20 having four span interfaces SPAN1–SPAN4. In the exemplary embodiment of FIG. 1, there are six interface modules 20, designated IM1–IM6.

The switching system 10 of the present invention couples to one or more base transceiver stations (BTSs) via one or more E1/T1 spans (referred to herein as "BTS spans").

The switching system 10 couples to the PSTN (not shown) via one or more E1/T1 spans (referred to herein as "PSTN spans"). The PSTN spans can include spans which follow the Signaling System No. 7 (SS7) signaling protocol as well as spans which carry Channel Associated Signaling (CAS) (referred to herein as "external SS7 spans" and "CAS spans," respectively).

Collectively, the switching modules 16, resource processors 18, 20, 22, control buses 24, high-speed buses 25, span signal paths 41, and span connector panel 42 are referred to as the Input/Output Sub-System (IOSS) or platform 27. In an exemplary embodiment, the IOSS 27 resides on a single shelf within a telecommunications equipment rack.

The control bus 24 preferably comprises a pair of redundant control buses over which the various resource processors 18, 20, 22 communicate using, for example, High Level Data Link Control (HDLC) channels. (Each of the redundant control buses is also referred to as an HDLC bus.) The high-speed data buses 25 carry various types of data including control and configuration information, signaling information and voice information, which may be encoded using various encoding schemes.

The communication hubs 26 are preferably Ethernet Local Area Network (LAN) communication hubs, although the hubs 26 may be hubs for other local networking protocols such as, for example, Token Ring or StarLAN. The communication hubs 26 and protocols may operate using either wired or wireless connection schemes. Although the resource modules 18, 20, 22 communicate with the higher-level functional elements in the system through the switching module 16, via TCP/IP sockets, through the communication hubs 26, other configurations are possible. It is possible in an alternative embodiment, for example, to have individual resource modules 18, 20, 22 directly connected to the call processor 12 and exchanging messages directly. With the present invention, a wide variety of IOSS hardware arrangements are possible without affecting the higher-level functions.

The exemplary switching system of FIG. 1 is based on one or more switching systems disclosed in U.S. patent application Ser. No. 09/026,360 (Docket No. 24194000.173), filed on Feb. 19, 1998, entitled FLEXIBLE TELECOMMUNICATIONS SYSTEM and incorporated herein by reference in its entirety, in U.S. patent application Ser. No. 09/025,870 (Docket No. 24194000.180), filed on Feb. 19, 1998, entitled INTEGRATED TELECOMMUNICATIONS SYSTEM and incorporated herein by reference in its entirety and in U.S. patent application Ser. No. 09/026,486 (Docket No. 24194000.196), filed on Feb. 19, 1998, entitled SYSTEM AND METHOD FOR FORMING CIRCUIT CONNECTIONS WITHIN A TELECOMMUNICATIONS SWITCHING PLATFORM and incorporated herein by reference in its entirety. Each redundant call processor 12 in the exemplary switching system 10 of FIG.

1 also includes a trunk signaling sub-system. In the exemplary embodiment of FIG. 1, the trunk signaling sub-system for each call processor 12 includes four SS7 trunk signaling cards 13 and several software components resident on the cards 13 as well as on the call processor. The SS7 signaling sub-system performs Message Transfer Part (MTP) and Signaling Connection Control Part (SCCP) functions and provides Transaction Capabilities Application Part (TCAP), ISDN User Part (ISUP) and Telephone User Part (TUP) user interfaces to the higher-level applications which use the SS7 sub-system.

In the exemplary embodiment of FIG. 1, the four SS7 cards 13 of each call processor 12 can handle four E1 trunks, one per card. Each group of four SS7 cards 13 is coupled by an E1 span 15 to the span connector panel 42 of the IOSS 27. Each of SPAN4 of IM5 and SPAN4 of IM6 is coupled to one of the two groups of SS7 trunk cards 13 on the redundant call processors 12. The spans 15 are also referred to herein as "internal SS7 spans" as they are internal to the switching system 10. This is in distinction to spans with SS7 signaling which are coupled to the system 10 externally, which are referred to as "external SS7 spans."

The SS7 trunk signaling sub-system of the present invention will be described in greater detail below.

Figure 2:
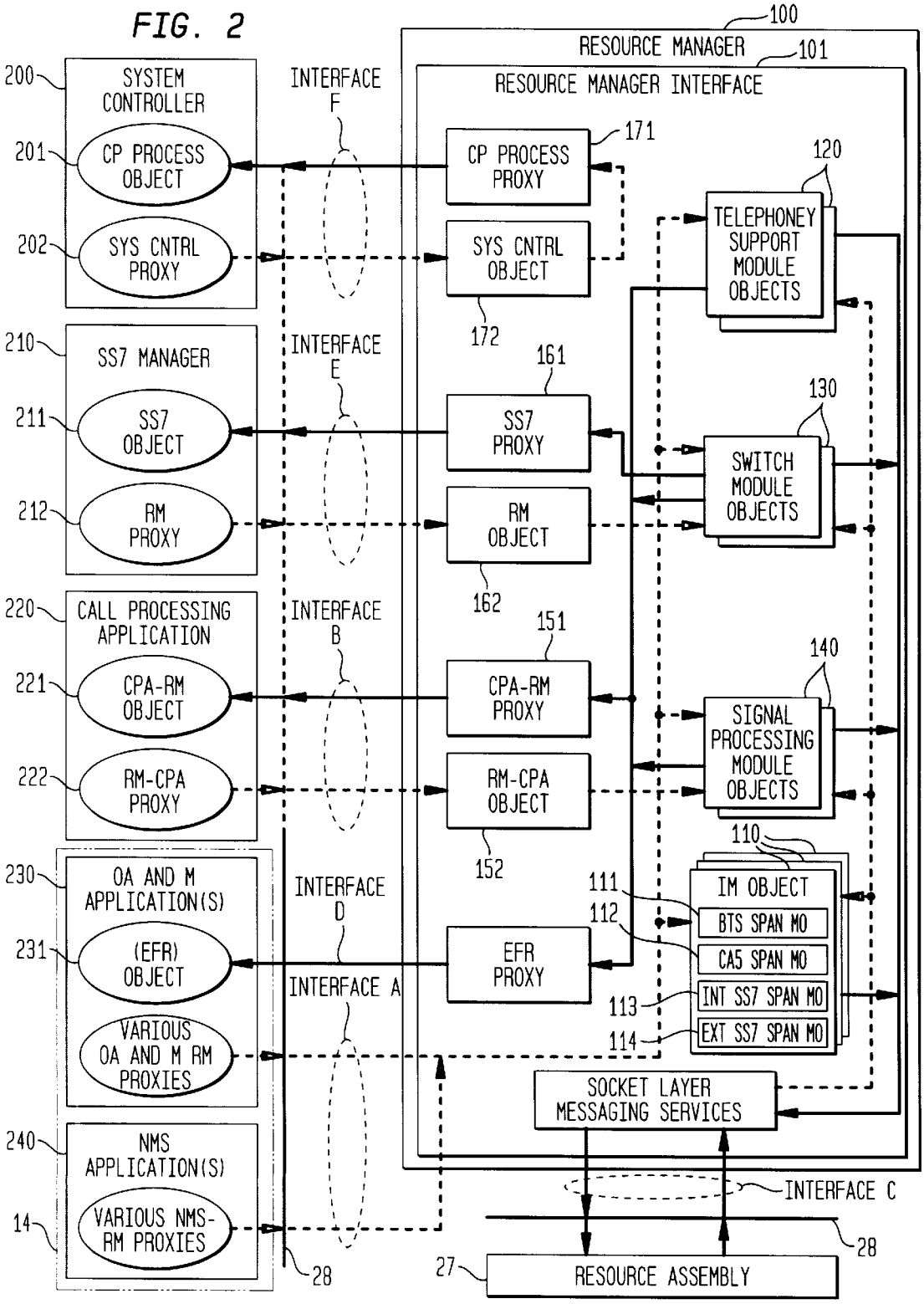
FIG. 2 is a block diagram of an exemplary embodiment of a software system with a resource management sub-system in accordance with the present invention.

With reference to FIG. 2, an exemplary software architecture of the switching system 10 of the present invention will now be described.

A central component in the software architecture depicted in FIG. 2 is the resource manager (RM) 100. The RM 100 is one of several processes running in the active call processor 12. The primary function of the RM 100 is to provide interfaces between the various other software components of the switching system 10 and the various resources of the resource platform 27. Another function of the RM 100 is to manage the integrity of the resources of the resource platform 27 while they are in use. The RM 100 also provides an OA&M interface for the configuration of resources and for notifying the NMS server 14 of any alarms or state changes that may occur with respect to the resources.

While the RM 100 interacts with the IOSS 27 in a message-based environment, the RM 100 interfaces with the higher-level functions in a distributed object-oriented environment. The RM 100 acts the interface between the two different environments. Objects modeling hardware and software components reside within the RM 100 and are used to model the IOSS 27, with its various hardware resources, as well as the RM 100 itself, to the higher-level functions such as the CP and NMS functions. These objects will be described below in greater detail.

The interfaces in which the RM 100 is involved and the various hardware and software components with which the RM 100 interfaces will now be described in greater detail with reference to FIG. 2. As shown in FIG. 2, the RM 100 is involved in six interfaces, designated A–F.

Interface A is an interface between the RM 100 and NMS applications 240 and OA&M applications 230 running on the NMS server 14. At the physical level, interface A is carried over the LAN 28 coupling the call processor 12 and the NMS server 14. At the software level, interface A provides an object model of the IOSS platform 27 to the NMS server 14 and to any NMS clients 32, 34 requiring OA&M control of the IOSS 27.

Interface A follows an object model in which the various physical components and resources of the IOSS 27 are modeled as managed objects (MOs). This object model appears as various CORBA (Common Object Request Broker Architecture)-compliant Object Request Broker (ORB) interfaces, with one ORB interface for every "Managed Object" (MO) in the system. As a CORBA object, each MO's interface is specified in a text file in a standardized syntax known as the CORBA Interface Definition Language (IDL). An IDL interface definition sets forth all of the operations (methods), parameters (attributes) and return values supported by the MO.

In the exemplary embodiment disclosed herein, there are nine different types of MOs modeled by the RM 100. They are: interface module objects 110, one for each IM 20; telephony support module objects 120, one for each redundant TSM 18; switching module objects 130, one for each redundant SM 16; signal processing module objects 140, one for each SPM 22; BTS span objects 111, one for each BTS span; CAS span objects 112, one for each CAS span; external SS7 span objects, one for each external SS7 span; internal SS7 span objects, one for each internal SS7 span 15; and a resource manager container object 101, for the RM 100 itself.

The primary purpose of the ORB MO interfaces is to allow configuration and maintenance control of all MOs modeled by the RM 100. The various managed object interfaces will be described in greater detail below. Preferably, interface A is a call and return interface, which from the client's point of view looks like a method call on a C++ object.

Interface A is used primarily by the NMS on the NMS server 14. Through interface A, the NMS can retrieve all managed object references contained within the RM 100, perform standard operations as well as retrieve standard attributes on all the managed objects in the RM 100. Interface A also provides any additional operations and attributes necessary for OA&M functions specific to the hardware objects.

Each individual MO preferably adopts those attributes and operations of a managed object that are relevant for that individual object.

As mentioned above, interface A is a CORBA-compliant ORB interface. CORBA ORBs allow for inheritance of interfaces, whereby one interface can be derived from another base interface, effectively inheriting all of the operations and attributes of the base interface. Interface A takes advantage of this feature, as many of the managed objects modeled by the RM 100 share common functionality. Therefore, the various interface classes in the IOSS RM's MOs are derived from a number of base interface classes.

Figure 3:
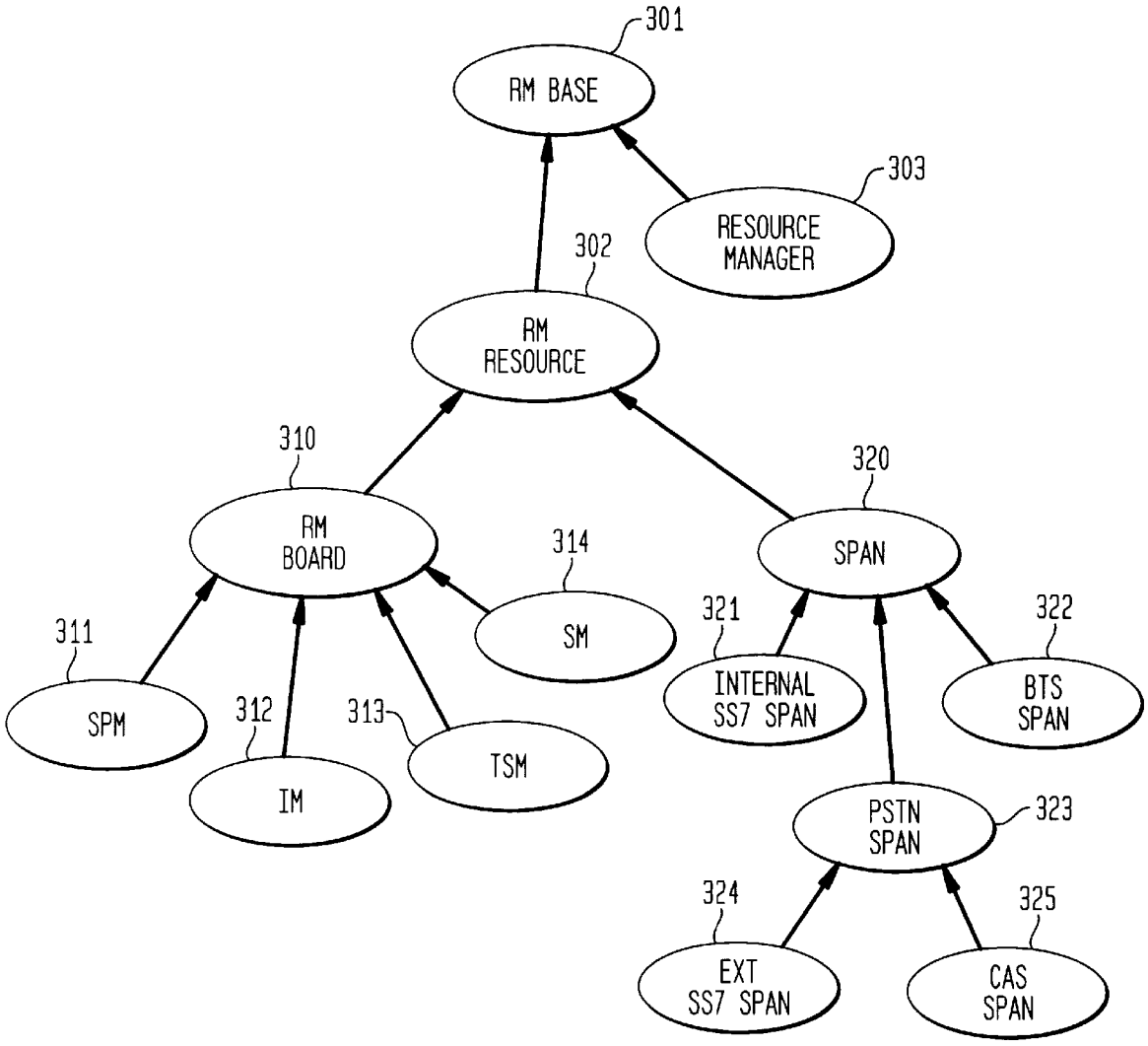
FIG. 3 is a diagram of an exemplary interface class hierarchy for modeled objects of an interface of the resource management system of the present invention.

FIG. 3 depicts the interface class hierarchy used in interface A. It is important to note that only the most derived interface classes (i.e., 311–314, 321, 322, 324 and 325) are concrete. The base classes 300–303, 310, 320, and 323 are all abstract interface classes.

The various managed objects and their corresponding operations and attributes are described below. All objects include "get" method calls for each attribute and all attributes not indicated to be read-only can be modified with a "set" method call. All concrete classes include "get <interface_name>" and if appropriate, "set <interface_name>" operations which allow the client to get all or set all attributes with one call. All concrete class MOs also include "description", "name" and "owner" attributes.

The RM Base class 301 provides operations for getting standard MO state attributes that are implemented in all objects modeled in the RM 100. Such attributes pertain to the various states that may apply to a modeled resource including its administrative state (LOCKED, UNLOCKED, or SHUTTING DOWN), usage state (IDLE, ACTIVE, or BUSY), operational state (ENABLED or DISABLED), alarm state (CRITICAL, MAJOR, MINOR, or CLEAR), availability status (AVAILABLE, OFF LINE, NOT INSTALLED, or LOADING) and unknown status (KNOWN or UNKNOWN). In the exemplary embodiment of the RM 100, these attributes are supported as read-only from the RM Base class 301 interface. It should be understood that these attributes need not all be applicable to all concrete classes of MOs and could mean different things to different concrete classes of MOs.

The RM Resource class 302 interface provides operations and attributes that are common to all MO resources modeled in the RM 100. Operations that can be carried out on all RM Resource MOs include: test (invokes a test on the resource), end test (stops a previously invoked test), lock (sets the administrative state of the resource MO to LOCKED), unlock (sets the administrative state of the resource MO to UNLOCKED). All RM Resource MOs include a "test types" attribute, a read-only sequence of structures defining the types of tests available on the resource and a short description of each. To determine the list of tests supported by the resource, a client would call get <test types> which would return the sequence of test type structures. An exemplary enumeration of tests includes SPAN LOOPBACK, SPAN REMOTE LOOPBACK, SPAN LOCAL LOOPBACK, and SPAN FRAMER LOOPBACK and can be extended to include more tests as they are made available. The client could then invoke a selected test via the "test" operation. The availability status of the resource MO will change to IN TEST while the test is in progress and will return to the original state upon completion of the test. A state change notification will be sent to the EFR (described below) indicating the test completion and the corresponding results will be packaged with the event. The client can abort the test prematurely by calling the "end test" operation.

The RM Board interface class 310 provides operations and attributes that are common to all MOs in the RM 100 which model physical hardware boards or modules in the IOSS 27 (i.e., IMs, TSMs, SPMs and SMs). Such operations include: upload (upload code from the board's flash memory and save it to a file), load (load code into the board's flash memory) and reset (forces a soft reset of the board if the board's administrative state is LOCKED). Attributes applicable to all RM Board MOs include: shelf and slot (indicate a shelf and slot in the IOSS 27 in which the board is inserted), hardware version (the hardware revision of the board), code versions (a sequence of structures indicating the types of code embedded in the board, their description, their current versions, and their available versions). All of these attributes are read-only.

To determine the current code version details of a board, a client would call get <code versions>, which would return a sequence of code version structures. When a client calls the load operation for a particular board, the corresponding MO will take on an availability status of LOADING, indicating to the client that the board should not be reset or powered down until it has moved to a stable availability status (OFF LINE or AVAILABLE). When loading is complete, the availability status will assume the state it contained before the load method was called and the RM Board MO will send a corresponding state change event via the EFR interface.

The Resource Manager interface class 303 includes the RM managed object 101 which is basically a container object for all of the MOs modeled in the RM 100. Preferably, it is the only MO interface that clients are allowed to bind to. All other MOs modeled in the RM 100 can be retrieved via a "members" container attribute which contains a sequence of strings representing the markers of all the MOs in the RM 100.

The following additional attributes are available on the RM MO 101: CAS span info (a sequence of data structures defining all of the CAS spans configured in the system), BTS span info (a sequence of data structures defining all the BTS spans configured in the system), external SS7 span info (a sequence of data structures defining all of the external SS7 spans configured in the system), internal SS7 span info (a sequence of data structures defining all of the internal SS7 spans configured in the system), slot info (a sequence of data structures defining all of the slots in the system), shelf info (a sequence of data structures defining all of the shelves in the system), operational state (DISABLED, until the startup sequence is complete with at least one SM in the system and ENABLED once startup sequence is complete with the first SM in the system; on changing state from DISABLED to ENABLED, the RM 100 will startup the CPA 220 by sending a startup event on interface B), description ("Resource Manager built on <DATE>"), name ("ResourceManager") and owner ("NONE").

The following methods are available on the RM MO 101: get slots per shelf (retrieves the number of slots available on a particular shelf of the IOSS 27), get number of shelves (retrieves the number of shelves currently known to the RM 100), get slot reference (retrieves a stringified object reference of the RM Board MO modeling the board inserted in the given shelf and slot), get slot description (retrieves a string describing the type of board that can be present in a particular slot on a particular shelf, i.e., "SM", "IM", "TSM" or "SPM"), and update-all-firmware-now.

The update-all-firmware-now method will update the firmware of all boards installed in the IOSS 27 starting with each SM 16. This method iterates through each slot of the IOSS 27 and through each load type that is needed by that slot and forces a download for each load type which does not match the released version. The upgrade software is obtained by this method from predetermined directories on the Call Processor 12. This operation will not upgrade boot code, which is done manually with the load command of the RM Board interface class 310. As such, almost all of the embedded software of the IOSS 27 can be upgraded with this one method.

Upon first interacting with the RM 100, such as upon startup, a client, such as an OA&M or NMS application should first obtain an object reference by connecting to the RM ORB (its implementation server will have a name, e.g., "RM", on the call processing host). If the operational state attribute is DISABLED at the time connection is attempted, the client should wait until the attribute has changed to ENABLED (this can be detected by waiting for a state change EFR event, described below, or by polling the attribute).

At this point, the client can proceed to determine the physical configuration of the IOSS 27 and the configuration of the RM 100 by one of several ways. In a first such procedure, the client could:

1) call the "get number of shelves" method;
2) for each shelf, determine the available slots by calling the "get the slots per shelf" method;
3) for each slot, retrieve the description of the supported resource type for that slot by calling the "get slot description method";
4) retrieve the contained MOs in the RM MO 101 by "getting" the members attribute; and 5) for each contained MO, get the operational-state and unknown status attributes:
   a) if the MO is ENABLED and KNOWN, then it can be assumed that the board is present, or
   b) if the MO is DISABLED, determine if the board is NOT INSTALLED by getting the availability status attribute; if the availability status is anything else, then it can be assumed that the board is installed but not available for use.

Binding to each board in each slot can slow down performance over a slow network connection. As such, the following alternative procedure for determining the configuration of the RM 100 and of the IOSS resources may be preferable:

1) get the "shelf info" attribute, which provides the number of slots in each shelf of the IOSS 27;
2) get the "slot info" attribute, which provides all details about each of the slots on each shelf and the state of each slot's contents (e.g., description, operational state, administrative state, alarm status, availability status, etc.); and
3) get the various span information attributes, which will provide all details about the state of all of the spans on each IM 20 in the system (e.g., operational state, administrative state, alarm status, etc.)

In this alternative procedure, all methods are performed on the RM MO 101 itself. As such, there is no need to explicitly bind to each board, thereby enhancing startup performance.

The SM interface class 314 provides attributes and methods for the SM MO 130 which models the SM 16, which is responsible for all switching tasks in the system 10. All of the operations available with the SM interface 314 are derived by inheritance, such as the ability to "load" and "reset" the SM 16. In addition to inherited attributes such as the shelf and slot of the SM, the SM interface also provides the following attributes: clock source1 (selects an IM slot number from which to extract the highest priority clock source), clock source2 (selects an IM slot number from which to extract the second priority clock source), system clock (selects the clock source, e.g., internal, source 1 or source 2, from which to drive the switching system), description (primary or secondary SM of redundant SMs), name (e.g., SM <Slot#>) and owner (i.e., "Resource Manager"). The clock selection attributes are writeable.

The TSM interface class 313 provides attributes and methods for the TSM MO 120 which models the TSM 18. All of the operations available with the TSM interface class 313 are derived by inheritance from the RM Board, RM Resource and RM Base classes, as shown in FIG. 3. In addition to inherited attributes such as the shelf and slot of the TSM 18, the TSM interface also provides the following attributes: description (primary or secondary TSM of redundant TSMs), name (e.g., PSM <Slot#>) and owner ("Resource Manager").

It should be noted that an additional intermediate interface class RM Redundant Board (not shown) can be inserted in the chart of FIG. 3 as deriving from the RM Board class 310 and with the TSM class 313 and SM class 314 deriving from the RM Redundant Board class. Such an interface class can be used to specify methods and attributes common to redundant boards such as the SM 16 and the TSM 18.

The SPM interface class 311 specifies attributes and methods for the SPM MOs 140 which model the SPMs 22. As with the SM and PSM classes, all of the operations available on the SPM interface class are inherited. In addition to inherited attribute types, each SPM MO includes the following attributes: description ("SPM on <shelf#> and <slot#>), name ("SPM <slot#>") and owner ("Resource Manager").

The IM interface class 312 provides attributes and methods for the IM MOs 110 which model the IMs 20 which are responsible for all the E1/T1 span interfacing tasks in the system. Each IM MO 110 is a container and can contain any combination of up to four BTS Span MOs 111, CAS Span MOs 112, Internal SS7 Span MOs 113, or External SS7 Span MOs 114, depending on how the modeled IM 20 is configured. Each IM MO 110 maintains the configuration for the corresponding IM 20, remembering which spans were configured and where, and contains attributes and operations for manipulating these objects.

In addition to all of the inherited types of operations, such as "load" and "reset," the IM interface class 312 provides additional operations such as: create/delete CAS Span (creates/deletes a CAS Span on a specified span number), create/delete BTS Span (creates/deletes a BTS Span on a specified span number), create/delete External SS7 Span (creates/deletes an External SS7 Span on a specified span number) and create Internal SS7 Span (creates an internal SS7 span on a specified span number). In addition to the inherited attribute types, MOs of the IM interface class 312 also make available the following attributes: number of spans (the current number of spans for which the corresponding IM is configured), description (e.g., "IM on <shelf#> and <slot#>), name (e.g., "IM <slot#>), owner ("Resource Manager") and members (a sequence of strings representing the markers of all Span MOs contained within the IM MO).

In addition to modeling board-based resources of the IOSS 27, the RM 100 also models span resources. The Span interface class 320 provides operations and attributes that are common to all spans modeled in the RM 100. In addition to inherited types of operations, the Span interface class 320 provides a "get channel type" operation which when called returns a CHANNEL TYPE parameter (e.g., traffic channel, trunk, LAPD, external SS7, internal SS7) corresponding to a particular subslot of a particular timeslot of the modeled span. In addition to inherited types of attributes, the Span interface class 320 provides the following attributes: Time Slots (a sequence of structures reflecting the channel configuration of the modeled span) and Span Number (the span number, 1–4, corresponding to the modeled span).

The Internal SS7 Span interface class 321 provides the methods and attributes of all Internal SS7 Span MOs 113 in the RM 100. The MOs 113 model the behavior of configured internal SS7 spans 15 coupled to any IM 20 of the IOSS 27. Each Internal SS7 Span MO 113 is logically contained within an IM object 110, as depicted in FIG. 2. The Internal SS7 Span interface class 321 is used in routing external SS7 spans to the internal SS7 spans 15. All operations available with this interface class are inherited. In addition to the inherited types of attributes, the Internal SS7 Span interface class 321 provides the standard concrete class attributes of description ("Internal SS7 Span number <span#> on IM in <Shelf#> and <Slot#>"), name ("Internal SS7 Span <span#>") and owner ("IM <Slot#>").

The BTS Span interface class 322 provides the methods and attributes of all BTS Span MOs 111, which MOs model the behavior of configured BTS spans coupled to any IM 20 of the system 10. Each BTS Span MO 111 is logically contained within an IM object 110. The BTS Span interface class 322 is responsible for all tasks related to communicating with a local BTS. All operations available by this interface are inherited. In addition to the inherited types of attributes, the BTS Span interface class 322 provides the standard concrete class attributes: description ("BTS Span number <span#> on IM in <Shelf#> and <Slot#>"), name ("BTS Span <span#>") and owner ("IM <Slot#>").

The PSTN Span interface class 323 provides methods and attributes that are common to all MOs in the RM 100 which model all configured PSTN spans coupled to an IM 20 of the IOSS 27. There are two interface classes derived from the PSTN Span class 323: the External SS7 Span class 324 and the CAS Span class 325. Each MO of the CAS Span class 325 models the behavior of a configured R2 or CAS span whereas MOs of the External SS7 Span class model the behavior of a configured SS7 Span. The PSTN Span interface class 323 is responsible for all tasks related to communicating with the PSTN. Each PSTN Span MO is logically contained within an IM MO. The PSTN Span interface inherits all of the operations and attributes common to all spans and resources in the system. As with the Span interface class 320, a client can request a description of all the timeslots on a PSTN Span. All operation types available with the PSTN interface class are inherited. In addition to the inherited attribute types, the PSTN Span interface class 323 provides the following attributes: crc4 (a writeable attribute which specifies the use of CRC4 error correction on the modeled PSTN span) and signaling (reflects the signaling type, CAS for CAS spans or Out-Of-Band (OOB) for SS7 spans, used on the PSTN span).

The CAS Span interface class 325 provides methods and attributes for the CAS Span MOs 112, which model the behavior of configured CAS spans coupled to any IM 20 of the system 10. Each CAS Span MO 112 is logically contained within an IM object 110. The CAS Span interface class 325 is responsible for all tasks related to communicating with a the PSTN over a CAS, or R2, span. All operations available by this interface are inherited. In addition to the inherited types of attributes, the CAS Span interface class 325 provides the description ("CAS Span number <span#> on IM in <Shelf#> and <Slot#>"), name ("CAS Span <Span#>") and owner ("IM <Slot#>") attributes.

The External SS7 Span interface class 324 provides the attributes and methods of External SS7 Span MOs 114, which model the behavior of configured SS7 PSTN spans coupled to any IM 20 of the system 10. Each External SS7 Span MO 114 is logically contained within an IM object 110. The External SS7 Span interface class 324 is responsible for all tasks related to communicating with the PSTN over an SS7 span. All operations available by this interface are inherited. In addition to the inherited types of attributes, the External SS7 Span interface class 324 provides the description ("External SS7 Span number <span#> on IM in <Shelf#> and <Slot#>"), name ("External SS7 Span <Span#>") and owner ("IM <Slot#>") attributes.

Interface B relates to the interface between the RM 100 and the call processing application (CPA) 220 running on the call processor 12. In the exemplary system of FIG. 1, this interface is internal to the call processor 12, as both the RM 100 and the CPA 220 run on the call processor 12. This is indicated in FIG. 2 by a dashed line. In accordance with the present invention, however, the RM 100 and the CP application 220 need not be running on the same hardware platform and in fact can run on widely distributed platforms.

Like interface A, interface B is a CORBA-compliant ORB interface. Unlike the call-and-return mechanism of interface A, however, interface B is event-based. The primary purpose of interface B is to provide a call processing event interface for interaction with the CPA 220. Interface B is preferably "channel-based," wherein events are passed across interface B containing handles to a channel associated with the event. This ORB interface is not a "Managed Object" model, but rather presents an event-based API between the RM 100 and the CP application 220. This allows the CPA 220 to send call processing events to the RM 100 and vice versa. In some cases these events are simply translated into Platform Message events, and passed on through interface C (described below) to the IOSS platform 27. In other cases, these events correspond to state changes in the managed objects of the RM 100 and to one or many Platform Message events. Similarly, one or more message events over interface C may result in one or more events over interface B and vice versa. An exemplary transaction involving events over both interfaces will be described below in greater detail.

Interface B can be thought of as comprising two one-way CORBA-compliant (IDL) interfaces. Each one-way interface provides a collection of events that encompass all of the functionality necessary to perform call processing over both the air and land lines to which the switching system 10 may be coupled. These interfaces are said to be "channel-based" because each event takes at least one argument, namely an identifier of a "channel" associated with that event. This provides a convenient mechanism for keeping the hardware details of the IOSS 27 out of the CPA 220, and making call processing substantially independent of the actual platform implementation.

The first one-way IDL interface, referred to as the CPA-RM interface comprises a CPA-RM proxy 151 in the RM 100 and a CPA-RM object 221 in the CP application 221, as depicted in FIG. 2. The CPA-RM proxy 151 acts as a server, and the CPA-RM object 221 acts as a client to that server.

Exemplary methods that can be called by the CPA 220 from the RM 100 on the CPA-RM proxy 151 include:

LAPD Methods

These include methods called by the CPA 220 for causing the IOSS 27 to add or delete LAPD channels, or links within LAPD channels, between the switching system 10 and a base transceiver station (BTS) coupled to the switching system 10 via an E1 span. Another LAPD method includes sending data across a specified LAPD link.

Traffic Channel Methods

These include methods for causing the IOSS 27 to add or delete traffic channels to or from a specified E1 span between the switching system 10 and a BTS. If the CPA 220 does not properly specify an E1 span (e.g., the identifier does not correspond to a configured E1 span coupled between the switching system and a BTS), the RM 100 sends an error event to the CP application 220 and reports an alarm to an OA&M application 230 (described below).

Trunk Methods

These include methods for causing the IOSS 27 to add or delete trunks to or from a specified E1 span between the switching system 10 and a PSTN. Other trunk methods include methods to seize a specified trunk for an originating call; to release a specified trunk (thereby tearing down a call); to configure a specified trunk (by specifying such parameters as line signaling type, register signaling type and direction); to collect an incoming sequence of digits on a incoming call; to send out a sequence of digits for an originating call; to indicate whether or not a incoming call has been successfully setup and routed and, if not, why; and to indicate that a dialed phone has answered a incoming call on a specified trunk. For each such method, if the CP application 220 does not properly specify an E1 span or trunk (e.g., the identifier does not correspond to a configured E1 span or trunk between the switching system and the PSTN), the RM 100 sends an error event to the CPA 220 and reports an alarm to the OA&M application 230.

Echo Canceler Control Methods

These include methods for causing the IOSS platform 27 to enable or disable echo cancellation on a specified traffic channel. A method is also included to indicate the occurrence of an intra-switch hand-over to the echo canceler DSPs handling the source and destination traffic channels. As with the other methods, any errors or alarms are reported to the CP application 220 and/or the OA&M application 230.

Switch Matrix Control Methods

These include methods for directing the IOSS platform 27 to setup or terminate one-way (simplex) or two-way (duplex) connections between specified pairs of channels. Methods are included to create or release three-way conferenced circuits and to add or drop channels from existing conferenced circuits.

Tone Playback Control Methods

These include methods for causing the IOSS 27 to generate a specified tone (e.g., ringback, dialtone, busy, DTMF) on a specified channel for a specified duration and to perform a specified action (e.g., apply silence or ringback or return to previous connection) with the specified channel after the tone has been removed. Other methods provide for initiating and terminating continuous tone playback and for generating a specified series of DTMF tones on a specified channel.

Announcement Control Methods

These include methods for causing the IOSS platform 27 to initiate or terminate the playback of a specified voice announcement for a specified number of repetitions on a specified channel and to perform a specified action (e.g., apply silence or ringback or return to previous connection) with the specified channel before the announcement is generated and after the announcement has terminated. Methods are also provided for initiating and terminating the recording of voice announcements from a specified channel.

For each of the above-described method calls, the RM 100 will check the method call for errors or inconsistencies (e.g., the CPA 220 specified an invalid LAPD channel in a data request method call). If an error is detected, the RM 100 will inform the CPA 220 accordingly by sending an event (e.g., "invalid LAPD") to the CPA 220 and will report an alarm to the OA&M application 230 (described more fully below).

The second one-way IDL interface, from the RM 100 to the CP application 220, referred to as the RM-CPA interface, comprises an RM-CPA proxy 222 in the CPA 220 and an RM-CPA object 152 in the RM 100, as depicted in FIG. 2. The RM-CPA proxy 222 acts as a server, and the RM-CPA object 152 acts as a client to that server.

Exemplary methods that can be called by the RM 100 from the CPA 220 on the RM-CPA proxy 222 include:

Startup Control Method

This method is called by the RM 100 once during the startup sequence after the IOSS 27 has indicated that its configuration has been completed. This method indicates the host server name of the RM 100 and is used by the CPA 220 to bind back to the CPA-RM interface.

LAPD Methods

These include methods called by the RM 100 to indicate to the CPA 220 that the IOSS platform 27 has established or released a LAPD link or to pass to the CPA 220 data received over a LAPD link by the IOSS platform 27.

Traffic Channel Control Methods

These methods are called by the RM 100 to indicate to the CPA 220 that a particular traffic channel is enabled or disabled or to indicate to the CPA that the CPA had previously invalidly specified a traffic channel in an operation requested over the RM-CPA interface.

Trunk Methods

These include methods by which the RM 100 indicates to the CPA 220 that a particular trunk has been enabled, disabled, seized or released (along with the duration of the call for billing). Other methods are included to indicate to the CPA 220 that an incoming call setup has begun on a particular trunk; that digits have been received on a given trunk, and what those digits are; that a call on a given trunk has been answered by the far end; that a glare condition has been detected during an attempted seizure of a trunk; and that an outgoing or incoming call has or has not been successfully set-up and routed.

Switch Matrix Control Report Methods

These include methods called by the RM 100 to inform the CPA 220 of failures in duplex or simplex connections; to report the creation or failure of a requested conference connection; and to report the success or failure of a requested addition of a port to a conferenced connection.

Tone Playback Control Report Methods

These include methods for informing the CPA 220 of a failure or completion of a continuous playback of a tone.

Announcement Control Report Methods

Included are methods called by the RM 100 for informing the CPA 220 of a failure or completion of an announcement playback; and for reporting to the CPA 220 whether or not the recording mechanism is available for recording a requested announcement or that the recording of an announcement has been completed.

Interface C provides the communication link between the RM 100 and the various hardware resources in the IOSS resource platform 27 that the RM is modeling. Interface C is carried over the LAN 28 coupling the call processor 12 and the IOSS resource platform 27 (more specifically, the redundant SMs 16) and is implemented as a TCP/IP connection-oriented socket. Interface C follows a messaging protocol for passing information through the TCP/IP socket.

An exemplary message format for both commands and events exchanged between the RM 100 and the IOSS platform 27 is set forth in Table 1 (where "UNITn" refers to an unsigned integer of n bytes).

TABLE 1

RM-IOSS Platform Message Format

| Field Name | Type | Description |
|---|---|---|
| length | UINT2 | The overall length of the message including header and payload data. Minimum legal length is for a message with a header only (e.g., 16 bytes). A length limit (e.g., 4096 bytes) is preferably placed on |

TABLE 1-continued

RM-IOSS Platform Message Format

| Field Name | Type | Description |
|---|---|---|
| | | all messages, and if the message is to be relayed via control bus 24, the length limit is preferably shorter (e.g., 336 bytes for messages to an IM 20 or TSM 18 and 536 bytes for messages to an SPM 22). |
| msg_type | UINT2 | Indicates the type of message. Messages are preferably grouped in ranges depending on the destination task in the operational software of the SM 16. |
| lci | UINT4 | The Logical Component Identifier of the entity to which the message refers. This is either the component acted upon by the command or the component referred to by the alarm/event/response message. |
| tag | UINT4 | Used to identify each individual instance of a command. The value in this field should be included in the tag field of any response to the RM 100 which relates to this particular command. A message in response to a request must contain the same tag ethat was initially delivered in the request. |
| source | UINT2 | Used by the IOSS 27 for internal routing of the message. |
| data_offset | UINT2 | This field points to the data payload, interpreted as an offset from the beginning of the header. If the message has no payload, then this will be equal to the size of a message header (e.g., 0 × 10). |

Logical component identifiers (LCIs) and their use in a telecommunications switching system are described in U.S. patent application Ser. No. 09/026,229 (Docket No. 2419400.186), filed on Feb. 19, 1998, entitled SYSTEM AND METHOD FOR DYNAMICALLY MAPPING COMPONENTS WITHIN A TELECOMMUNICATIONS SWITCHING PLATFORM and incorporated herein by reference in its entirety.

Exemplary types of command and event messages that can be exchanged between the RM 100 and the IOSS platform 27 will now be described.

A first group of messages includes configuration and state control messages. These messages are used to control and to report on the various components and resources in the IOSS 27. These include a configuration message from the SM 16 to inform the RM 100 what state the SM is in, as well as what type of resource module (16, 18, 20, 22) is in each slot of the connected IOSS backplane. The RM sets the state of the SM managed object 130 (see FIG. 2) to correspond to the SM state delivered in the message payload. By default, the RM 100 initializes itself with the contents of a standard backplane with a managed object for each resource module that could possibly be inserted into the IOSS backplane. If the RM 100 detects from the configuration message that the SM 16 is not connected to a standard backplane, the RM 100 will destroy the default managed objects and create new ones to correspond to the new backplane information contained in the message. The RM 100 responds to such a configuration message with a message to the SM 16 indicating that the RM is ready.

In addition to informing the RM 100 of the configuration of the IOSS platform 27, the SM 16 will also send messages to the RM 100 with configuration data for each module coupled to the IOSS backplane that checks-in or "registers" with the SM. The configuration data sent may include the LCI of the registering module, the module type (SM, IM, TSM, SPM), the state of the module (RESET, ONLINE, OFFLINE, ERROR), the hardware revision number of the module, the version numbers of the boot and field-programmable software codes of the module. One such message is sent for each module at startup or upon insertion of a module into the IOSS platform 27. The secondary SM 16 will send a configuration message with configuration data just for itself. The RM 100 looks at the configuration data for each module and sets the managed object associated with that module to appropriately reflect the state of the module, the reported hardware version and the various code versions. Depending on the module type and state, the RM may also send configuration messages to the module.

Messages are also included to indicate to the RM 100 that a particular IOSS resource has gone online or offline. For all RM Resource interface class 302 managed objects for which the RM 100 receives such a message, the RM will accordingly set their operational state to ENABLED or DISABLED, their availability status to AVAILABLE or OFF LINE, and their unknown states to KNOWN. The RM 100 also uses these messages to determine which ones of the various redundant resource modules (i.e., SM, TSM, or SPM) are the active modules. If a message is received by the TM 100 informing the RM that a particular IM 20, SPM 22 or span has gone offline, the RM 100, in turn, informs the CPA 220 that any channels associated with the now offline resource are now also disabled. The SM 16 will also inform the RM 100 if a module has stopped communicating with it (i.e., as when the module is removed). In that case, the RM 100 will reset the configuration for that board and put it in an UNKNOWN state.

The RM 100 can send a message to the IOSS 27 requesting that a specified resource be brought back online. If the request cannot be met, the IOSS 27 will respond with an alarm identifier related to the reason of failure. The RM 100 can also request that a specified resource be taken offline, usually in response to a command from the OA&M application 230. If the resource is, for example, an SPM 22 or IM 20 that is currently providing channel resrouces to the CPA 220, the RM 100 notifies the CPA 220 of the loss of these resources.

The RM 100 can command the SM 16 or any other module to perform a reset of its software, usually in response to a reset command from the OA&M application 230. The RM 100 can also request a module to load itself with certain software or other dynamic data (e.g., tone data, voice messages). Such a request can be initiated by a module itself.

Another subset of configuration messages allows the RM 100 to request the IOSS platform 27 to add or delete a LAPD channel on a specified timeslot of a specified span. When requesting the addition of a LAPD channel, the RM 100 will specify a SAPI and a TEI of an initial LAPD link which the IOSS platform will establish over the newly added LAPD channel.

Similarly, the RM 100 can command the IOSS platform 27 to add or delete a traffic channel on a specified timeslot of a specified span. These messages are usually sent when the CPA 220 requests the addition of the first traffic channel to a traffic channel circuit or when it requests the deletion of the last traffic channel on a traffic channel circuit. (It should be noted that each 64 kbps traffic channel circuit can carry up to four 16 kbps traffic channels in the exemplary switching platform of the present invention.) Furthermore, with respect to traffic channels, the IOSS platform 27 can send messages to the RM 100 indicating that 1) a traffic channel has moved (such as when a resource such as an SPM or DSP to which the traffic channel is allocated becomes unavailable and as a result, the traffic channel is reallocated), or that 2) a traffic channel has been lost (such as when a resource such as an SPM or DSP to which the traffic channel is allocated becomes unavailable and no other resources are available for reallocation). In the second case, the RM 100 responds by disabling the traffic channel and marking it as unconfigured.

Another configuration message allows the RM 100 to notify the appropriate IM 20 that the RM 100 is deleting a span (i.e., deleting the MO modeling the span) and that the IM 20 is to reset the physical span connection to its initialized state, thereby deconfiguring the span. Similarly, a further configuration message allows the RM 100 to notify the appropriate IM 20 that the RM is deleting a trunk (object) from a particular span (object) and that the IM 20 is to reset the trunk (i.e., the timeslot assigned to the trunk) to its initialized state.

Another subset of configuration messages deals with the system clock, whereby the RM 100 can request that a specified clock source, such as a clock extracted from a span, be used as the system clock or that a specified span extract its clock to the bus. These messages are sent by the RM 100 to the IOSS platform 27 at startup or on command from the OA&M application 230.

The RM 100 can also send a message to the IOSS platform 27 to configure a specified IM 20 and any number of the four spans coupled to that IM. This message is sent every time an IM 20 checks-in and there is configuration information available for the IM. The configuration parameters sent for each span can include the type of signaling used (e.g., CAS or OOB signaling), whether error correction (e.g., CRC4) is enabled and the type of span (e.g., GSM Abis, PSTN, GSM A, CDMA, AMPS, E1).

A second group of messages exchanged between the RM 100 and the IOSS platform 27 includes test control messages. These include messages whereby the RM 100 requests that a specified span perform a test, such as a fault isolation test (FIT) or a loopback test. Such requests are usually sent by the RM 100 on command from the OA&M application 230. The IOSS 27 responds to a FIT request with the results of the test. If there was a failure, the IOSS 27 indicates the LCI of the resource that failed. The RM 100 passes these results to the OA&M application 230. When requesting a loopback test, the RM 100 can specify one of several test modes (e.g., remote, local, framer). The IOSS platform 27 responds to such a request upon successful completion of the requested test.

A third group of messages, which are applied on a call-by-call basis, are used for turning on or off certain functions on the SPMs 22. With these messages, the RM 100 can direct the IOSS platform 27 to enable or disable echo cancellation on a specified traffic channel. In the case of an intra-system handover in which echo cancellation is required, the RM 100 can send another message to the IOSS platform 27 informing the platform of the source and destination traffic channels. The purpose of this message is to allow the IOSS platform 27 to move DSP data from the echo cancellation DSP assigned to the source traffic channel to the echo cancellation DSP assigned to the destination traffic channel. These messages are sent by the RM 100 to the IOSS platform 27 upon receipt by the RM 100 of corresponding events from the CPA 220, described above.

A fourth group of messages are used to control the switching matrix in the active SM 16. With these messages, the RM 100 can request that the SM establish or terminate simplex or duplex connections between specified channels. Also included are messages whereby the RM 100 can direct the SM to create or kill a conferenced connection among three ports or modify a conferenced connection by adding or removing a leg therefrom. Switch SM control messages are usually sent by the RM 100 to the IOSS platform 27 in response to corresponding events from the CPA 220.

A fifth group of messages are involved in the playing of tones on a specified connection. Included are messages by which the RM 100 can request that a TSM 18 in the IOSS platform 27 continuously play or stop a specified tone, play a specified tone for a specified duration, play a specified periodic tone for a specified number of cycles, or play a specified sequence of DTMF tones on a specified channel. These messages are usually sent by the RM 100 to the IOSS platform 27 in response to corresponding events from the CPA 220.

A sixth group of messages are used to control the voice messaging system on the TSM 18. These include commands by which the RM 100 can request the IOSS platform 27 to play a specified voice message on a specified channel for a specified duration and a specified number of repetitions. The RM 100 can also specify the action to be performed on the channel before and after the message playback is completed. Also included are commands for initiating and terminating the recording of voice messages. Access to the record mechanism is preferably password protected. As such, a valid password must be provided by the RM 100 to enable the recording mechanism. These messages are usually sent by the RM 100 to the IOSS platform 27 in response to corresponding events from the CPA 220.

A seventh group of messages control the LAPD connections between the CPA 220 (in particular, the BSC component) and a BTS coupled to the switching system 10 via a span. (These messages may not mirror the complete functionality of the LAPD protocol as some LAPD functions can be performed on the SM 16.) For the most part, the LAPD-related messages "pass through" the RM 100 on their way to or from the CPA 220 or the IOSS platform 27. The RM 100 is preferably not involved in the state of LAPD signaling. This responsibility is owned by the appropriate parts of the CPA 220 and IOSS platform 27

These include messages for causing the IOSS platform 27 to add or delete LAPD channels, or links within LAPD channels, between the switching system 10 and a BTS. Another such message is sent by the RM 100 to direct the IOSS platform 27 to send a packet of data across a specified LAPD link to the BTS. These messages are usually sent by the RM 100 to the IOSS platform 27 in response to corresponding events from the CPA 220.

Also included are messages from the IOSS 27 to the RM 100 to indicate that a LAPD link has been established or released or to pass to the RM 100 a packet of data received over a LAPD link by the IOSS 27. In response to such messages from the IOSS 27, the RM 100 will send corresponding events to the CPA 220.

An eighth group of messages are used for call control signaling on PSTN trunks (e.g., R1 or R2 signaling trunks). These messages are generally "passed through" by the RM 100 between the CPA 220 and the IOSS 27. The RM 100 preferably is not involved in the state of the trunk signaling. This responsibility is preferably owned by the appropriate parts of the CPA 220 and the IOSS platform 27. The LCI in the message header of each of these messages corresponds to the trunk associated with the message.

This group of messages includes messages sent by the RM 100 for causing the IOSS 27 to seize a specified trunk for an outgoing call, thereby starting the outgoing call setup process; to release a specified trunk (thereby tearing down a call); to configure a specified trunk (by specifying such parameters as line signaling type, register signaling type, whether ANI should be collected, and direction); to block a specified trunk so that it cannot receive calls; to collect an incoming sequence of digits on a specified trunk; and to send out a sequence of digits for an originating call. Messages are also included whereby the RM 100 can indicate to the IOSS 27 whether or not an incoming call has been successfully setup and routed or to indicate that a dialed phone has answered an incoming call on a specified trunk. These messages are sent by the RM 100 to the IOSS platform 27 in response to corresponding events from the CPA 220.

Also included are messages by which the IOSS platform 27 informs the RM 100 that a particular trunk has been seized or released (along with the duration of the call for billing). Other messages are included to indicate to the RM 100 that a trunk has received a ring indication (thereby indicating that an incoming call setup has begun); that digits have been received or collected on a given trunk, and what those digits are; that a call on a given trunk has been answered by the far end; that a glare condition has been detected during an attempted seizure of a trunk; and that an outgoing or incoming call has or has not been successfully set-up and routed. In response to such messages from the IOSS platform 27, the RM 100 will send corresponding events to the CPA 220.

A ninth group of messages are sent by the IOSS 27 to the RM 100 to indicate alarms and other events originating in the IOSS. For example, in one such message, the IOSS 27 can indicate the occurrence of a software error, a resource with which that error is associated and an indication of the severity of the error. The RM 100 preferably sends any alarm or error indications from the IOSS platform 27 to an Event Filtering and Reporting (EFR) server in the OA&M layer 230, as discussed below.

Interface D is a one-way, event-based interface from the RM 100 to an EFR object 231 in the OA&M application 230. In the exemplary embodiment, interface D is provided by the OA&M application 230 and used by the RM 100. Like interface A, interface D is carried over the LAN 28 between the call processor 12 and the NMS server 14. Interface D is a CORBA-compliant ORB interface, wrapped in a C++ class API. The RM 100 and its contained MOs will generate various "event notifications" whenever they are created, deleted, change state, or encounter an alarm, software error or operation violation. Interface D is used by the RM 100 to forward such notifications to an EFR object 231 in the OA&M application 230. The OA&M application 230 contains an EFR server (not shown) which will provide the event notifications to any clients that are interested.

An event notification may contain the following information fields:

Notification Type; a CCITT X.721 recommended enumeration of notification types (e.g., COMMUNICATION_ALARM, ENVIRONMENTAL_ALARM, EQUIPMENT_ALARM, OBJECT_CREATION, OBJECT_DELETION, SOFTWARE_ERROR, TEST_RESULT, STATE_CHANGE, ATTRIBUTE_VALUE_CHANGE, OPERATION_VIOLATION, PROCESSING_ERROR_ALARM);

Object ID; a stringified object reference of the MO originating the event;

Additional Text: a string of additional text related to the event;

Attribute ID: if the Notification Type is STATE_CHANGE or ATTRIBUTE_VALUE_CHANGE, this element identifies the associated attribute;

Old Value: if the Notification Type is STATE_CHANGE or ATTRIBUTE_VALUE_CHANGE, this element indicates the old value of the attribute ID;

New Value: if the Notification Type is STATE_CHANGE or ATTRIBUTE_VALUE_CHANGE, this element indicates the old value of the attribute ID;

Probable Cause; an enumeration of possible probable causes;

Source Indicator: set to RESOURCE for events originated from the RM 100;

Specific Problems: a string of text that identifies the problems associated with an event;

Perceived Severity: an enumeration of severity levels.

The event notifications generated by the RM 100 and its MOs can be categorized into three groups: Event reports, State Change reports, and Alarm reports.

All event reports generated by the RM 100 and its MOs are common to the RM Base interface class 301 (see FIG. 3). This means that any of the following events can be generated from an RM Base object, but in general each RM Base object will only generate a subset of the events described below. Such events include:

object creation

Whenever an RM Base Managed Object is created via user configuration (e.g., create_BTSSpan or create_PSTNSpan) or via restoration from configuration data (i.e., at startup). The creation of an RM Base Managed Object does not necessarily correspond with the physical existence of the resource that the object represents. Such a determination can be made from the state attributes of the object.

object deletion

This event is reported whenever an RM Base MO is deleted via user configuration (e.g., delete_BTSSpan or delete_PSTNSpan) or when the RM 100 is shutting down. This does not necessarily mean that the actual resource modeled by the object has been physically removed or destroyed, but could mean that the process managing these objects has been shutdown.

software error

This event is reported whenever the RM 100 encounters a software error or whenever it receives a SOFTWARE_EVENT message from the Platform. Software errors are distinguished from alarms in that the operator cannot take any corrective action to solve the indicated error.

software alarm operation violation

This event is reported whenever the RM 100 encounters an illegal invocation on interface A (with the OA&M application 230). The RM can determine the invocation to be illegal if a bad parameter is passed or the invocation is made during an incompatible operating state of the invoked object of the RM.

In the exemplary system of the present invention, some state change reports are common to all RM Base interface class 301 managed objects (or "RM Base MOs") and some are common to all RM Resource interface class 302 managed objects (or "RM Resource MOs"). State change events include:

Unknown Status State Change

This event is reported whenever the RM 100 loses or establishes the status of any RM Base MO. Until the unknown status of an MO has moved to KNOWN, the integrity of all attributes on that object cannot be trusted.

Administrative State State Change

This event is reported whenever the administrative state of an RM Resource MO undergoes a state change. This event is usually initiated by the operator's performing a "lock" or "unlock" operation on an RM Resource MO. Normally, on a lock request, the RM Resource MO will move to a $SHUTTING_{13}$ DOWN state until the MO's usage state moves to IDLE, at which time the availability status will completely move to LOCKED. Each state change in this sequence will include an appropriate state change event.

Usage State State Change

This event is reported whenever the usage state of an RM Resource MO undergoes a state change. There are times when the usage state of an RM Resource MO may be IDLE, meaning it is completely free of use; ACTIVE, meaning it is in use, but can accommodate further usage requests; and BUSY, meaning it is completely in use, and can accommodate no more usage requests. This state can change as a side effect of a "lock" request from an operator, or it may occur naturally during operation. As an example, the usage state of a span will move from IDLE to ACTIVE as calls are placed on that span. Once all the circuits on the span are involved in calls, the usage state will move from ACTIVE to BUSY, implying that no more calls can be placed on the span at that time. Subsequently, an operator may request that a span be "locked". This causes the span usage to be controlled and eventually driven to IDLE. As each circuit becomes free from use, further usage is blocked. Once all channels are free from use, the span will be moved to the IDLE usage state, and the administrative state can be moved to LOCKED.

Operational State State Change

All RM Resource MOs change operational state once the corresponding physical resource reports that it has gone ONLINE (ENABLED) or OFFLINE (DISABLED). This can occur as a result of an operator request that an RM Resource MO be "locked" or as a natural change during operation of the system (e.g., during system startup, RM Resource MOs move from DISABLED to ENABLED as each RM Resource MO notifies the RM 100 of its initial startup state).

Availability Status State Change

All RM Resource MOs send availability status state change reports to provide detail about why a resource is or is not currently available for use. In the exemplary embodiment of the RM 100 described, only RM Board Mos will report a new availability status of LOADING. However, all other values can be assumed by all RM Resource MOs.

The types of events for which Alarm Reports are generated by the RM and/or its MOs include: EQUIPMENT_ALARM Events (e.g., module cannot run in this slot, Wrong software loaded on this module, TSM failover, DSP hardware has failed, System is no longer redundant, SM Failure, download failed, etc.); ENVIRONMENTAL_ALARM Events (e.g., excessively high or low temperature level, IM detected span slip, etc.); COMMUNICATION_ALARM Events (e.g., received invalid message from SM, BIT determined that a QSM span failed, SM receiving bad frames from BTS, unknown BTS requesting access, etc.); and PROCESSING_ERROR_ALARM Events (generated by the firmware of the IOSS 27 and indicate that a software problem has occurred, such as no free resources available, problem sending data over TCP/IP socket, problem receiving data over socket, problem creating socket, etc.)

Interface E is an interface between the RM 100 and a specialized resource manager, the SS7 RM 210, which is used to manage the SS7 trunk signaling resources of the switching system 10. Like interface B, this interface is internal to the call processor 12, as both the RM 100 and the SS7 RM 210 run on the call processor 12, in the exemplary embodiment.

The primary purpose of interface E is to receive commands from the SS7 RM 210 that direct the RM 100 to provide connections from an internal SS7 span 15 (a span hardwired to the SS7 cards 13 installed in the call processor 12) to an external SS7 span (a span available externally through an E1 connection). This is done to configure, or "nail-up", individual SS7 signaling links.

Like interface B, interface E can be thought of as comprising two one-way CORBA-compliant (IDL) interfaces. Interface E, although an ORB interface, is not based on a managed object model but rather is an event-based API between the RM 100 and the SS7 RM 210.

The IDL interface from the RM 100 to the SS7 RM 210 is referred to as the RM-SS7 interface. The SS7 RM 210 provides an RM proxy 212 which acts as a server and the RM 100 acts as a client 162 to that server. Once it is done initializing, the RM 100 calls a startup method on the RM proxy 212 informing the SS7 RM 210 that the RM 100 is ready to start receiving SS7 link events from the SS7 RM and informing the SS7 RM of the name of the server of the RM 100 (i.e., SS7 proxy 161) that the SS7 RM 210 will use to communicate with the RM 100 in the future.

The IDL interface from the SS7 RM 210 to the RM 100 is referred to as the SS7-RM interface. The RM 100 provides an SS7 proxy 161 as a server and the SS7 RM 210 acts as a client 211 to that server. Methods on the SS7 proxy 161 called by the SS7 RM 210 include: a startup method for notifying the RM 100 that the SS7 RM 210 is done initializing (the RM 100, in turn, informs the CPA 220); a method for notifying the RM 100 that the SS7 RM 210 is going offline and the reason for doing so; a method for adding an SS7 signaling link, in response to which the RM 100 directs the IOSS 27 (via interface C) to create a nailed-up duplex connection between a timeslot on an internal SS7 span 15 and a timeslot on an external SS7 span, as specified by the SS7 RM 210; and a method to remove an SS7 signaling link, thereby removing an existing duplex connection between a timeslot on an internal SS7 span 15 and a timeslot on an external SS7 span. The SS7 RM 210 also sends failure notification events to the RM 100.

The SS7 RM 210 will be described below in further detail.

Interface F is provided between the RM 100 and the call processor system controller (CPSC) 200 and is also a CORBA- compliant ORB interface. The CPSC 200 is responsible for ensuring that all processes on the call processor 12, such as the RM 100, have started-up and remain running. As denoted by the dotted vertical line in FIG. 2, interface F is internal to the call processor 12. The primary purpose of interface F is to send and receive state change events and periodic process monitoring messages between the RM 100 and the CPSC 200. Like interface B, interface F is event-based, as opposed to the call and return mechanism used in interface A, and can be treated as comprising two one-way CORBA-compliant (IDL) interfaces.

The CPSC-to-RM portion of interface F is preferably a common interface type; i.e., each process running on the call processor 12 has an interface of this type.

The IDL interface from the CPSC 200 to the RM 100 is referred to as the CP process (CPP) interface, in which RM 100 provides a server 171, and the CPSC 200 acts as a client 201 to that server. The CPP interface is used for process control and monitoring.

The following methods are called by the CPSC 200 on the server 171: an offline request method for putting the RM 100 into an offline state, in response to which the RM closes all of its write sockets and sets its internal state to OFFLINE; a lock request method for informing the RM 100 that it should be shutdown gracefully, in response to which the RM 100 sets its internal state to SHUTTING DOWN, starts monitoring usage until all resources are idle and once idle, and sends a lock indication to the CPSC 200 to inform it that it is now safe to kill the RM 100; and an unlock request method for informing the RM 100 that it no longer needs to be locked, to which the RM 100 responds by re-enabling any resources that had previously been blocked from usage. In addition, the CPSC 200 periodically calls a "heartbeat" method on the server 171 to which the RM 100 responds with an acknowledgment, indicating that the RM 100 is up and running.

The RM-to-CPSC portion of interface F is not necessarily a common interface type. In the IDL interface from the RM 100 to the CPSC 200, the CPSC 200 provides a proxy 202 which acts as a server, while the RM 100 acts as a client 172 to that server. This interface is available on the CPSC 200 immediately after startup and is used to streamline the system startup process and to help the CPSC 200 to determine the state of the call processor 12.

There are two methods on the proxy 202 that may be called by the RM 100: 1) an online indication method to notify the CPSC 200 that the RM 100 and SS7 RM 210 have finished initialization and configuration and are ready to bring the call processor 12 online; and 2) a lock indication method to notify the CPSC 200 that the RM 100 has completely shutdown and can be killed by the CPSC 200.

Figure 4:
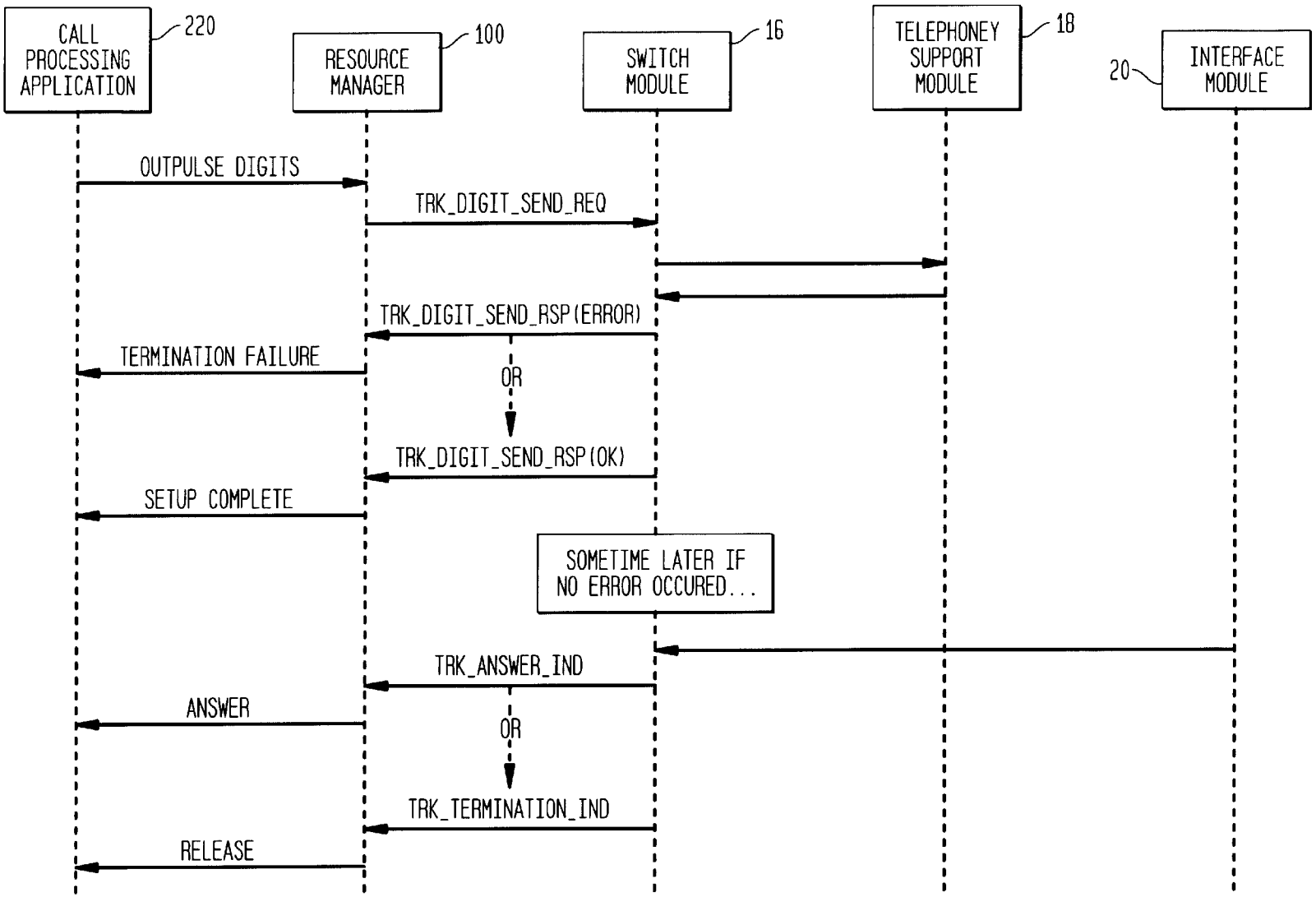
FIG. 4 illustrates an exemplary exchange of messages among various components of the exemplary switching system.

To further illustrate the operation of the RM 100, an exemplary message flow involving the RM 100 will now be described. Such a message flow is shown schematically in FIG. 4. The exemplary message flow of FIG. 4 pertains to the process of sending digits for a trunk-terminated call which begins with an OUTPULSE DIGITS command from the CPA 220 to the RM 100 over interface B. The RM 100, in turn, sends a TRK_DIGIT_SEND_REQ message to the SM 16 in the IOSS 27. The SM 16 routes this request to the appropriate resource module, in this case, the TSM 18. The SM 16 responds to the request from the RM 100 with a TRK_DIGIT_SEND_RSP message. This response message will either indicate that the request to send digits succeeded ("OK") or it will indicate an alarm ID if the request failed ("ERROR").

If the TRK_DIGIT_SEND_RSP message from the SM 16 indicates an ERROR, the RM 100 will forward a TERMINATION FAILURE event to the CPA 220, indicating the reason for the failure (e.g., signaling failure, TSM unavailable, switching failure, etc.)

If the RM 100 receives an OK indication from the SM 16, it will forward a SETUP COMPLETE event to the CPA 220. The SETUP COMPLETE event will include a setup status field with setup information (e.g., subscriber line busy or out of order, subscriber line free, congestion in network, unallocated number, etc.) that was contained in the TRK_DIGIT_SEND_RSP message sent from the SM 16 to the RM 100. At some later time when the called party answers, the IM 20 through which the call is routed will so indicate to the SM 16 which will send a TRK_ANSWER_IND to the RM 100. The RM 100, in turn, sends an ANSWER event to the CPA 220 indicating that the far end has answered the call on the indicated PSTN trunk.

At some further later time when the call is terminated, the SM 16 will send a TRK_TERMINATION_IND to the RM 100 indicating that the signaling on the specified trunk has terminated and providing a metering count received from the terminating end. The metering count indicates the duration of the call. The RM 100, in turn, sends a RELEASE event to the CPA 220 informing the CPA 220 that far end has disconnected or that it is responding to a release from the near end. The RELEASE event also includes the metering count which can be used for billing purposes.

As disclosed above, the RM 100 can interface with a specialized resource manager, namely, the SS7 RM 210 in the exemplary embodiment described above. The SS7 RM 210 will now be described in greater detail.

A typical telecommunications switching system, whether wireless or wireline-based, interfaces to the PSTN and/or PLMN over standard, digital trunk lines, such as E1 or T1 lines. In addition to carrying user data, e.g., digitized voice, such trunk lines carry signaling data in accordance with one or more established signaling protocols. One such protocol is Signaling System No. 7 (SS7), specified by the International Consultative Committee for Telegraphy and Telephony (CCITT). SS7 provides for the exchange of supervisory signals, address signals and other signals between switching systems. SS7 signaling is carried over one 64 kbps channel of the E1 or T1 trunk.

SS7 is composed of two basic components: a message transfer part (MTP) and multiple user parts (UP). The MTP has three levels of signaling which provide signaling functions over a single data link and network functions for switching signaling messages through a packet-switched network. The UPs are functional procedures for the exchange of messages through the signaling links, or network, irrespective of the modes of transmission or routing. Examples of UPs are the Integrated Services Digital Network User Part (ISUP) and the Telephone User Part (TUP).

For a wireless switching system, SS7 allows MSCs, BSCs, VLRs and HLRs to reside on different nodes or in different networks and provides a transport mechanism for MAP dialogues between them. Multiple SS7 links can be setup between such resources. It also allows for out-of-band (OOB) signaling between two SS7 switches.

In the exemplary switching system 10 of the present invention, the SS7 platform comprising the SS7 cards 13 has an E1-type interface to the PSTN and a TCP/IP interface to the call processor 12.

Figure 5:
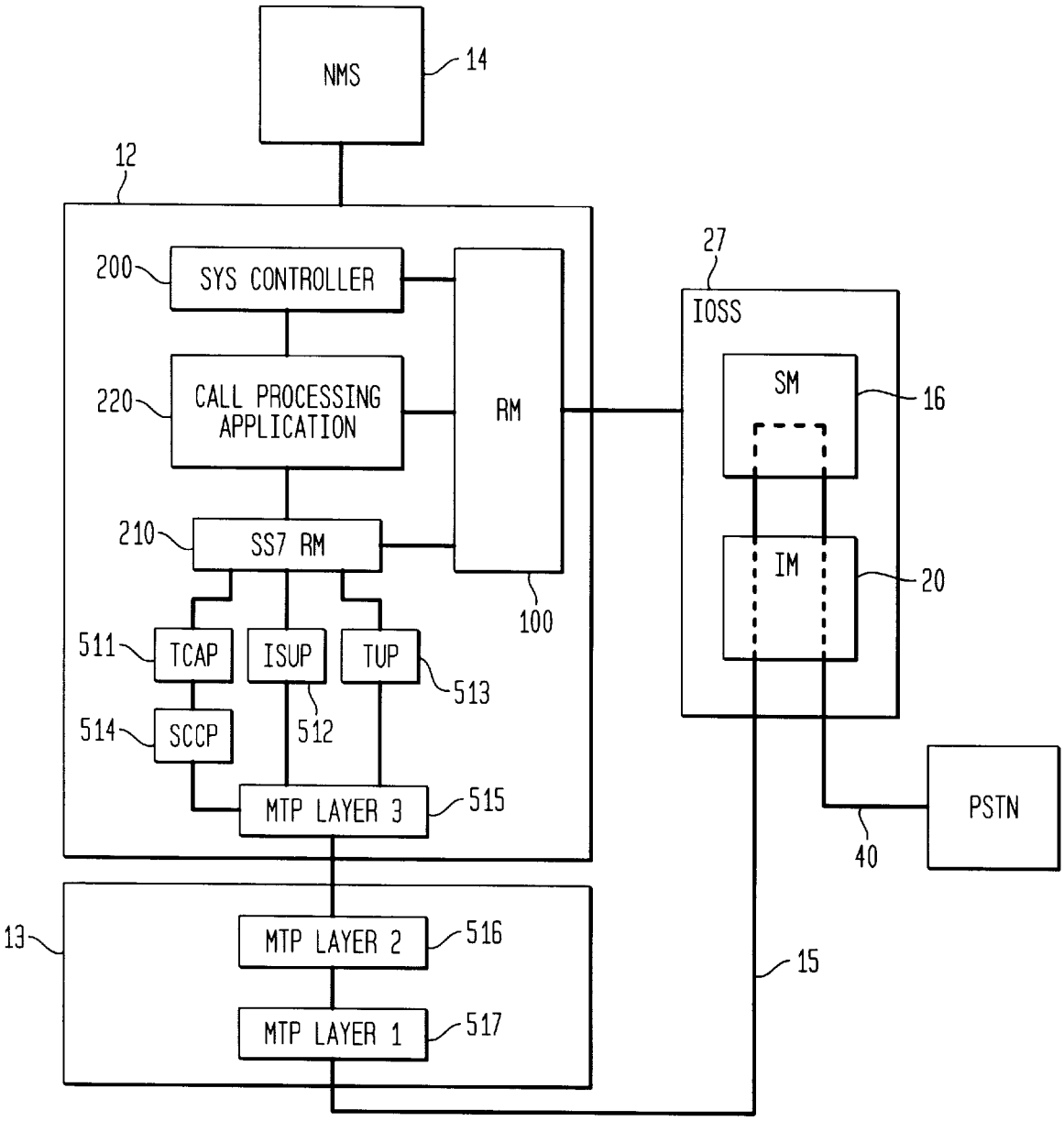
FIG. 5 is a block diagram of an exemplary software arrangement including two resource management systems.

FIG. 5 is a block diagram illustrating the various components of the SS7 signaling sub-system and the various entities with which it interacts. As described above, the system 10 is a redundant system with two redundant call processors 12, with each call processor having its own dedicated SS7 platform comprising four SS7 cards 13. The following description is of the SS7 sub-system as it pertains to a single call processor 12. In a redundant system the configuration and characteristics of the SS7 sub-systems on both sides will be identical.

The SS7 sub-system comprises the signaling cards 13, which interface with the call processor 12, and several software components running on the call processor 12, namely, the SS7 RM 210, a TCAP component 511, an ISUP component 512, a TUP component 513, an SCCP component 514 and an MTP layer 3 component 515. Two additional software components of the SS7 sub-system, an MTP layer 2 component 516 and an MTP layer 1 component 517 reside on the SS7 cards 13.

All software components below the SS7 RM 210, namely components 511–517, as well as the cards 13 are available from Data Kinetics, Ltd. As their labels suggest, these components are respectively responsible for performing all MTP layer and SCCP layer functions as well as providing TCAP, ISUP and TUP user interfaces to the applications which utilize the SS7 signaling sub-system. The SS7 sub-system can be implemented with a PC running the QNX Operating System and having a standard ISA bus with a minimum of four ISA slots, one for each Data Kinetics SS7 controller card 13.

The exemplary embodiment of the SS7 sub-system of FIG. 5 has four interfaces: 1) an NMS server interface, 2) an SS7 network interface, 3) a call processing application (CPA) interface and 4) interface E, described above, with the RM 100.

The NMS server interface is an Orbix TCP/IP interface. It is used by the NMS server to transmit SS7 configuration data for MTP links, MTP link sets, MTP routes, SCCP local and remote subsystems, and SCCP Global Title Translation information. The NMS server interface is also used by the SS7 platform to report SS7 maintenance events, operational measurements, and any operational faults.

The SS7 network interface comprises four E1 ports, one per SS7 controller card 13. Each SS7 card 13 is equipped with either two standard 75 ohm BNC connectors, one for transmit and one for receive, or one 120 ohm RJ48 module connector.

The CPA interface is also an Orbix interface and is used by the CPA 220 to send and receive SS7 messages to and from other SS7 nodes in the PSTN or PLMN. SS7 messages received by the SS7 platform from the network are delivered to the appropriate subsystem within the CPA 220, while SS7 messages received from the CPA 220 are processed for SS7 routing information and delivered to the SS7 network.

As shown in FIG. 5, external SS7 links on one or more E1 spans 40 coupled to the PSTN are consolidated into a single E1 span 15 using a nailed-up connection through the SM 16 in the IOSS 27.

Figure 6:
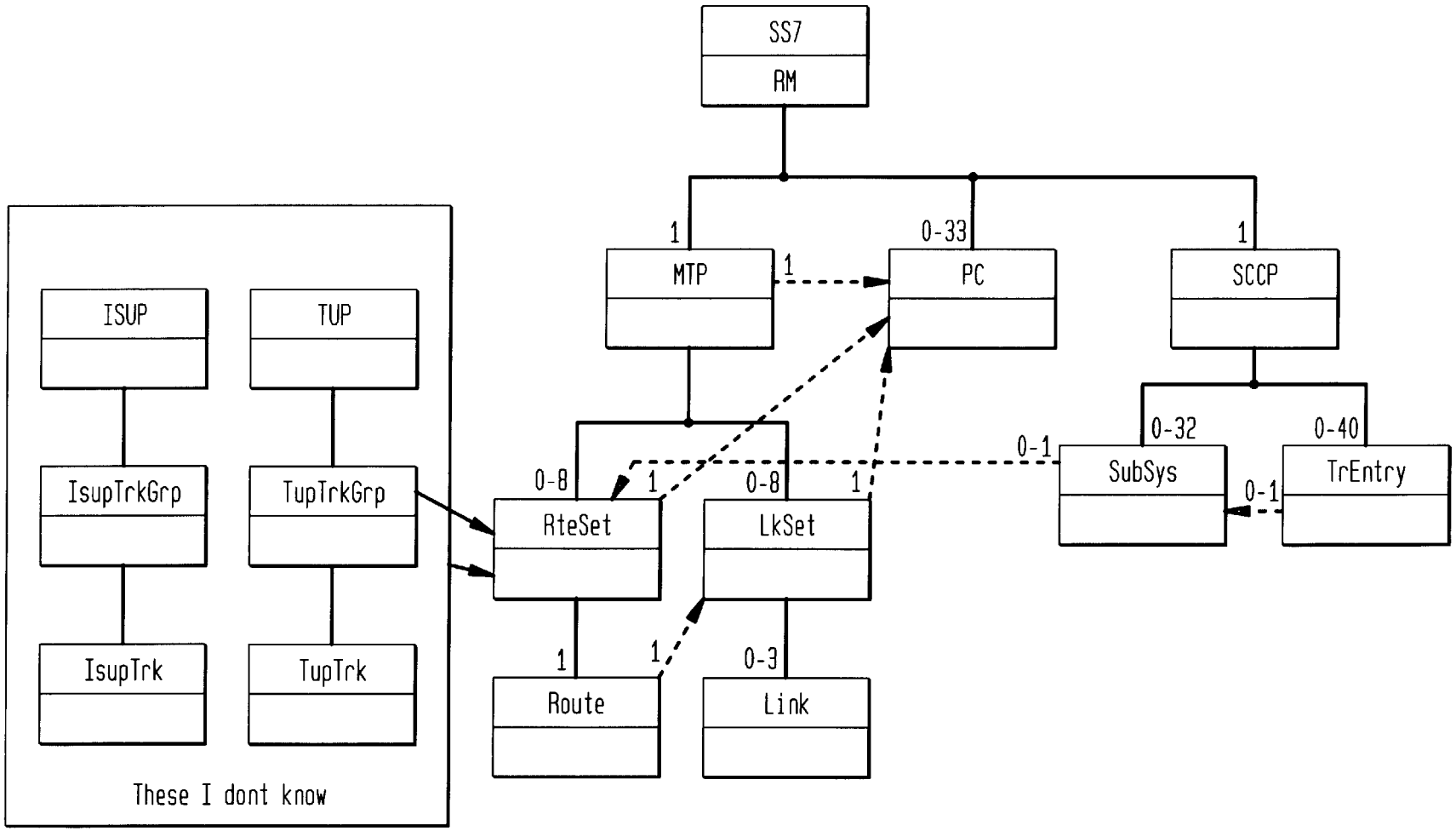
FIG. 6 is a block diagram illustrating an object model for an exemplary embodiment of a resource management system.

Like the RM 100, the SS7 RM 210 provides a hardware-independent, object model of the resources which it manages, in this case, the SS7 signaling sub-system. FIG. 6 illustrates the relationships among the various managed objects modeled by the SS7 RM 210. Solid lines represent containment relationships. Where a solid line meets the top of an object, a range of numbers is included representing the number of those objects that can be contained in the container object. Dotted arrows represent inter-object references and their multiplicity. The number range at the base of a dotted arrow represents the potential number of references that can be made from that object to the object type pointed to by the arrow.

The managed objects modeled in the SS7 RM 210 will now be described. Each object, except for the SS7 object, includes a name attribute. The managed objects include:

A single SS7 object representing the SS7 hardware. This object has no attributes. The SS7 object provides methods to add or delete a Point Code object (described below) to the SS7 sub-system.

Multiple (e.g., 33) Point Code objects, each representing an MTP point code. There is one Point Code object for each point code the SS7 sub-system communicates with plus one for the local node. Each Point Code object has an SS7-defined point code (e.g., zone, network and signal point IDs) and a national/international network indicator attribute. Each Point Code object provides get and set methods for accessing its attributes.

One MTP object representing the SS7 MTP function and having an attribute indicating the name of the Point Code object of the originating point code. The MTP object provides methods for adding or deleting Route Set and/or Link Set objects (described below) in addition to get and set methods.

One MTP Measurements object (not shown) with a resetable, read-only attribute which indicates the number of message signal units for which no outgoing routes were available.

One Link object for each SS7 signaling link. As shown in FIG. 6, up to three Link objects can be contained in each Link Set object (described below) in the exemplary embodiment of the present invention. The attributes of each Link object include: the signaling link code (0–15) of the modeled link, which code is used by the MTP function during link selection, the name of the SS7 span hosting the modeled link, the timeslot of the link, the SS7 state of the link (e.g., UNKNOWN, IN_SERVICE, OUT_SERVICE, INIT_ALIGN, etc.), the operational state of the link (i.e.,ENABLED or DISABLED) and the administrative state of the link (e.g., LOCKED, UNLOCKED. or SHUTTING_DOWN). In addition to attribute get and set methods, each Link object provides lock and unlock methods to control the administrative state of the link.

One Link Measurements object (not shown) for each Link object provides resetable performance management measurements of a particular Link (e.g., number of changeover attempts, duration link unavailable, duration link has been locally or remotely inhibited, duration of unavailability due to failure, number of SIO and SIF octets Message Signaling Units transmitted, etc.)

Up to eight Link Set objects, one for each link set. A link set defines a set of links to an adjacent signaling port. Attributes for each Link Set object include: adjacent Point Code (the name of the Point Code object corresponding to the adjacent point code for this link set), operational state and administrative state of the link set. Besides attribute get and set methods, each Link Set object provides methods to add or delete a specified Link object and to change the administrative state (lock/unlock) of the link set.

One Link Set Measurements object (not shown) for each Link Set object; provides resetable performance management measurements of the modeled link set (e.g., duration for which link set has been unavailable, the number of times or duration for which the adjacent Signaling Point has been inaccessible).

One Route object for each Route Set object (described below). Each Route object represents the destination signaling point and is contained inside a Route Set object. Attributes include the name of the Link Set object representing the link set to be used for this route and the operational state of the route.

One Route Measurements object for each Route object; provides performance management measurements for the modeled route (e.g., number of times the route has been unavailable and the duration of unavailability).

Up to eight Route Set objects, one for each SS7 route set. Each route set defines a set of routes to a destination signaling point. Attributes of each Route Set object are used to designate the name of the Point Code object corresponding to the destination signaling point and to indicate the operational state of the route set. Besides attribute get and set methods, each Route Set object can add or delete a Route object. Each Route Set object can be referenced by managed objects in other applications such as the MSC. As shown in FIG. 6, ISUP and TUP Trunk Group objects in the MSC can reference each Route Set object.

One Sub System object for each SCCP subsystem. There can be multiple (e.g., 32) remote SCCP subsystems defined in the SS7 system of the present invention. Each object includes an attribute to indicate whether the modeled subsystem is local or remote, an attribute with the name of the Route Set object used to route to the subsystem and an attribute with the number of the subsystem. Attribute get and set methods are provided for the aforementioned attributes.

One SCCP object representing the SCCP function. The SCCP object provides methods to add or delete a global title Translation Entry object (described below) and to add or delete a Sub System object.

One Translation Entry object for each translation entry in the global title translations table. Multiple (e.g., 40) Translation Entry objects may be contained within the SCCP object. Each entry includes a match digit pattern and a route set, which are provided as attributes of the Translation Entry object representing the entry. The match digit pattern is used to match the global title digits being routed on. If a match occurs, then the attributes, destination subsystem (the name of the Sub System object representing the destination subsystem) and called Address Format are used to select a destination and build the SCCP routing address. Instead of the destination subsystem attribute, the route set attribute can be used to route the matched address.

As with objects of the RM 100, each object in the object model of the SS7 RM 210 may generate State Change reports, event reports and/or alarm reports. For example, the SS7 object generates an EQUIPMENT ALARM report when the SS7 Resource Manager 210 detects a hardware failure or can not communicate with one of the SS7 controller cards 13. Each Link object can generate several kinds of COMMUNICATION ALARM reports to indicate the occurrence of such events as a changeover, a remote processor outage or signaling link congestion. The SCCP object can generate different COMMUNICATION ALARM reports to report various Q.791 events. The format and contents of the various reports generated by the SS7 RM objects are similar to those generated by the RM objects, described above.

What is claimed is:

1. A resource management system comprising:

a first interface, the first interface being adapted to exchange messages with a hardware resource; and a second interface, the second interface including a managed object which models the hardware resource.

2. A system comprising:

a controller; and a resource management system comprising:

a first interface, the first interface being adapted to exchange messages with a hardware resource; and a second interface, the second interface including a managed object which models the hardware resource, wherein the controller controls the hardware resource by interacting with the resource management system through the second interface.

3. A system comprising:

a controller;

a first resource management system, the first resource management system including:

a first interface, the first interface being adapted to exchange messages with a first hardware resource; and a second interface, the second interface including a first managed object which models the first hardware resource; and a second resource management system, the second resource management system including:

a third interface, the third interface adapted to exchange messages with a second hardware resource; and a fourth interface, the fourth interface including a second managed object which models the second hardware resource;

wherein, the controller controls the first and second hardware resources by interacting with the first and second resource management systems through the second and fourth interfaces.

* * * * *